US010545467B2

(12) United States Patent
Brassard (10) Patent No.: US 10,545,467 B2
(45) Date of Patent: Jan. 28, 2020

(54) GENERIC CONFIGURATION PARAMETERS SHARED AMONGST GROUPS OF STORE CONTROLLERS

(71) Applicant: Parker-Hannifin Corporation, Cleveland, OH (US)

(72) Inventor: Jean-Paul Brassard, Quebec (CA)

(73) Assignee: Parker-Hannifin Corporation, Cleveland, OH (US)

( * ) Notice: Subject to any disclaimer, the term of this patent is extended or adjusted under 35 U.S.C. 154(b) by 211 days.

(21) Appl. No.: 15/542,256

(22) PCT Filed: Jun. 8, 2015

(86) PCT No.: PCT/US2015/034682
§ 371 (c)(1),
(2) Date: Jul. 7, 2017

(87) PCT Pub. No.: WO2016/114813
PCT Pub. Date: Jul. 21, 2016

(65) Prior Publication Data
US 2017/0357535 A1 Dec. 14, 2017

Related U.S. Application Data

(60) Provisional application No. 62/103,255, filed on Jan. 14, 2015.

(51) Int. Cl.
*G05B 15/02* (2006.01)
*G06F 16/23* (2019.01)
(52) U.S. Cl.
CPC ............. *G05B 15/02* (2013.01); *G06F 16/23* (2019.01)
(58) Field of Classification Search
CPC .................................. G05B 15/02; G06F 16/23
See application file for complete search history.

(56) References Cited

U.S. PATENT DOCUMENTS 6,141,595 A   10/2000   Gloudeman et al.
6,473,661 B1  10/2002   Wollner
(Continued)

FOREIGN PATENT DOCUMENTS

WO     2004/070482 A1    8/2004

OTHER PUBLICATIONS

International Search Report and Written Opinion for corresponding patent application No. PCT/US2015/034682 dated Oct. 12, 2015.

*Primary Examiner* — Meng Ai T An
*Assistant Examiner* — Michael W Ayers
(74) *Attorney, Agent, or Firm* — Renner, Otto, Boiselle & Sklar, LLP (57) ABSTRACT

A system for controlling a plurality of facilities includes a plurality of facility modules for controlling operation of a facility, each facility module corresponding to a respective facility of the plurality of facilities, and a control module communicatively coupled to the plurality of facility modules. The control module has access to a plurality of configuration parameter groups, each configuration parameter group of the plurality of configuration parameter groups including at least one configuration parameter, and association logic defining an association between at least some of the plurality of facility modules and at least one configuration parameter group. Upon a configuration parameter group being modified, the control module is configured to identify the modified configuration parameter group and identify from the association logic facilities associated with the modified configuration parameter group, and communicate the modified configuration parameter group to each associated facility modules.

9 Claims, 4 Drawing Sheets

(56) References Cited

U.S. PATENT DOCUMENTS

| | | | |
|---|---|---|---|
| 9,002,481 B2 * | 4/2015 | Leen | G05B 15/02 |
| | | | 700/9 |
| 9,477,241 B2 * | 10/2016 | Schultz | G05D 23/1905 |
| 2011/0093493 A1 * | 4/2011 | Nair | G06Q 10/06 |
| | | | 707/769 |
| 2011/0113360 A1 * | 5/2011 | Johnson | H04L 12/2825 |
| | | | 715/771 |
| 2012/0296451 A1 * | 11/2012 | Kaps | H04L 12/282 |
| | | | 700/83 |
| 2015/0045959 A1 * | 2/2015 | McPherson | G05D 23/1951 |
| | | | 700/276 |
| 2018/0219374 A1 * | 8/2018 | Pavlak | H02J 3/00 |

* cited by examiner

Figure #2 - Example of Generic Parameters

Legend:
Store [1] is in indoor group $\mathcal{X}$ and outdoor group $\mathcal{A}$
Store [2] is in indoor group $\mathcal{X}$ and outdoor group $\mathcal{B}$
Store [3] is in indoor group $\mathcal{Y}$ and outdoor group $\mathcal{A}$

|  | Group 1 | Group 2 | Group 3 | Group 4 | ••• | Group n |
|---|---|---|---|---|---|---|
| Facility 1 | 1 | 0 | 1 | 0 | ••• | 1 |
| Facility 2 | 0 | 0 | 1 | 0 | ••• | 0 |
| Facility 3 | 0 | 0 | 1 | 0 | ••• | 0 |
| Facility 4 | 1 | 0 | 0 | 0 | ••• | 0 |
| Facility 5 | 1 | 1 | 1 | 0 | ••• | 1 |
| Facility 6 | 0 | 1 | 1 | 1 | ••• | 1 |
|  |  |  |  |  | ⋮ |  |
| Facility n | 0 | 0 | 1 | 0 | ••• | 1 |

GENERIC CONFIGURATION PARAMETERS SHARED AMONGST GROUPS OF STORE CONTROLLERS

This application is a national phase of International Application No. PCT/US2015/034682 filed Jun. 8, 2015 and published in the English language.

RELATED APPLICATION DATA

This application claims the priority of U.S. Provisional Application No. 62/103,255, filed on Jan. 14, 2015, which is hereby incorporated in its entirety by reference.

FIELD OF INVENTION

The present invention relates generally to process control and monitoring systems and, more particularly, to an apparatus and method for storing and sharing generic parameters among a plurality of business facilities.

BACKGROUND

Conventionally, facilities, such as convenience stores, grocery stores, warehouses, etc., are managed through a facility-wide control system. Such systems enable monitoring of data, such as temperatures (e.g., room temperature, cooler temperature, outdoor temperature, etc.), system status (e.g., cooling system operation, air quality, energy consumption, etc.), as well as changing system operation (e.g., lighting schedules, heating/cooling schedules, etc.).

When changing system operation for such facilities, a user typically opens a configuration page for each facility, changes the desired settings for that facility, saves the changes, and then sends the changes to the facility. As will be appreciated, as the number of facilities increase such process is not only time consuming but can also be prone to user error.

SUMMARY OF THE INVENTION

A system and method in accordance with the present disclosure simplify the process of updating configuration parameters for a plurality of facilities. In accordance with the present disclosure, configuration parameters are arranged in groups, each group having at least one configuration parameter. The groups of configuration parameters are stored as a single copy, for example on a server or the like, and each facility is associated with one or more of the groups. Upon a configuration parameter within a group being modified, only the facilities associated with the modified group are provided with the updated data. In this manner, storage and maintenance of configuration parameters is simplified, and network traffic is minimized.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings

BRIEF DESCRIPTION OF THE DRAWINGS

Many aspects of the invention in accordance with the present disclosure can be better understood with reference to the following drawings. The components in the drawings are not necessarily to scale, emphasis instead being placed upon clearly illustrating the principles in accordance with the present disclosure. Likewise, elements and features depicted in one drawing may be combined with elements and features depicted in additional drawings. Additionally, in the drawings, like reference numerals designate corresponding parts throughout the several views.

FIG. 1 is a schematic diagram illustrating an exemplary system in accordance with the present disclosure.

FIG. 2 is a schematic diagram illustrating sharing of groups of configuration parameters among different facilities in accordance with the present disclosure.

DETAILED DESCRIPTION

A system and method in accordance with the present disclosure will be described in the context of convenience store chain. It is understood, however, that principles in accordance with the present disclosure are applicable to a control system for any type of facility, including but not limited to warehouses, department stores, home improvement stores, grocery stores, restaurants and the like.

The system and method in accordance with the present disclosure can control and monitor a group of convenience stores (referred to herein as a C-Store) from a central location. With reference to FIG. 1, an exemplary C-Store System is shown. The system includes a group of applications that run on a control module 4, e.g., one or more servers. The applications allow administrators to remotely configure and monitor the equipment of all stores 1, 2, 3 within the chain, e.g., across the state, country, or world. In one embodiment, the physical server(s) are located at the chain corporate office 20. In another embodiment, the physical servers are part of a server farm.

The system also includes a facility module 11 for each store. Each respective facility module, which may include a processor, memory and logic stored in memory, is operative to monitor and control in real time facility equipment 12, 13. Such facility equipment may include lighting controls (indoor and outdoor lighting), climate controls (heating, cooling, refrigeration, etc.), power consumption, alarm generation, and the like.

A network (or a combination of networks), such as (but not limited to) the internet network 23, communicatively couples the control module 4 to each facility module 11. Such communication mechanism allows the control module 4 to configure, control and/or monitor all facility modules 11.

Each facility module 11 includes hardware and software configured to monitor and/or control the store equipment 12, 13. The store equipment 12, 13 may be directly or indirectly monitored and controlled by the facility module 11. For example, in one embodiment store equipment 12, 13 may be operatively coupled to the facility module 11 by means of input/output (I/O) modules 21, the I/O modules under control of the facility module 11. In another embodiment, the store equipment 12, 13 may operatively coupled to remote control modules 21a that are communicatively coupled to the facility module 11 via an internal network 21b. Each facility module 11 also includes hardware 14, 15 (e.g., network interfaces, routers, etc.) and software configured to communicate with the control module 4.

Additionally, each facility module 11 can be coupled to a local display 5 to enable local viewing and/or modification of configuration parameters. For example, the local display 5 can be used to perform maintenance functions on the system. Alternatively or additionally, a portable local display 7 can be used to perform maintenance on the system.

Optionally, a browser running on a laptop 8, cell phone/tablet 9, or other portable device can be used to connect to the control module 4 and/or facility module 11. In this manner, authorized users can access the control module 4 via a facility network 14 and the facility firewall 15, or directly via the internet 23. Once connected, an authorized user (e.g., maintenance personnel 6) can access each facility module 11, provided the maintenance personnel has proper authorization to access the respective facility module 11. Possible maintenance functions include monitoring facility operations, changing configuration settings, etc.

In addition, region managers 10 can access the system, for example, through a web browser (e.g., via a laptop 8). Such access, which may be limited based on privileges associated with the region manager 10, enables remote monitoring and/or modification.

To manage the system, the exemplary control module 4 may include a database server 16, a facility server 17, a web server 18 and a business rules server 19 communicatively coupled to each other via a central server network 24. The servers can be applications that can run on separate physical servers, applications on a shared physical server, or applications on virtual servers.

Users that are located physically near the control module 4 may connect directly to the control module 4 via the central server network 24. Other users may connect to the control module 4 via an external access mechanism, e.g., the internet 23. Such external access may require the use of a VPN connection, according to the security rules requested by the facility administrator, and preferably uses a firewall 25 to protect system information from unauthorized access.

The database server 16 provides a central storage mechanism for keeping the complete configuration of all facility modules 11, whether already installed or to be installed in the future. Such storage mechanism also can be used to store information received from each facility module 11. For example, the information may include a current state of the facility as well as historical data for the facility. The database server 16 also can store information pertaining to system users and their access level and/or privileges within the system, as well as all other information needed to manage the system, including, but not limited to, a log of all pertinent events that occur on the system, such as user actions.

The facility server 17 can act as a dispatch mechanism that manages the communication between the control module 4 and all the facility modules 11. Such bidirectional link enables transfer of configuration parameters to given facility module 11 (down link), as well as transfer of data from the facility modules 11 to the control module 4 (up link). For the down link, facility server 17 is configured to select which information is sent to a given facility module 11. The facility server up link first decodes the data sent by facility module 11, and then stores the data at the appropriate location into the database server 16. Similarly, when a user modifies the configuration parameters for a given facility, the facility server 17 sends the changes to the facility module 11 that manages the given facility 1, 2 or 3.

Web server 18 provides an access mechanism that enables web browsers 8, 22 to access control module 4 and/or facility module 11. Access may be provided, for example, through choice of visual interfaces (e.g., web pages), which allow users to view and/or to modify chosen subsets of the information stored in the database server 16 based on individual user privileges.

Business rules server 19 provides a validation mechanism for the system, and can act as an interface and a filter between the web server 18 and the database server 16. The business rules server 19 is operative to enable/restrict access to particular information based on an access level and/or privileges associated with each user according to security business rules and/or to process control rules. For example, the business rules may prevent a "store manager" from changing the control temperature of cold rooms, while the process control rules may prevent any user from configuring the control temperature of an Ice Room to be above a given high limit.

In operation, each facility module 11 controls various sub-systems (e.g., refrigeration, lighting, HVAC, power use, etc.) based on configuration parameters. Most configuration parameters are facility-specific, i.e., they are dedicated to one given facility, and each facility will have its specific configuration values stored on the database server 16. Such specific parameters may include, for example, parameters related to sensor calibration.

In addition to facility-specific parameters, the system also includes generic parameters. Generic parameters are not specific to a given facility but instead follow general rules common to all facilities (e.g., holiday schedules or country-specific regulations) and/or common to facilities that belongs to a given geographical or administrative region.

One example of generic configuration parameters are the schedules for the general operation of the facilities, e.g., when the facility will be open for business, when the consumer traffic is heavy, when control strategies can operate in energy saving mode, etc. Another example of generic configuration parameters is dates in which the facilities may operate under special circumstances, e.g., national or state holidays, special days (e.g., day of mourning), etc.

Another example of generic configuration parameters include alarm specifications, such as, but not limited to, the minimum and maximum acceptable temperatures for a given refrigeration or HVAC equipment, the energy consumption limit for the facility or sub-system, etc. For example, some alarm limits may be "produce dependant" and/or may vary according to the season. Other alarm limits, such as those related to energy consumption limit, could be adjusted to take into account heating versus cooling needs during a given period of the year.

It can be useful to share such alarm limits among all facilities of the corporate chain, or at least among all facilities of given regions, to maintain a level of consistency between facilities. In accordance with the present disclosure, the generic configuration parameters are stored in a database, such as on the database server 16.

In this regard, the generic parameters may be stored in the form of groups. For example, HVAC parameters for the stores near the ocean may be stored in a first group, and HVAC parameters for the stores on the top of a mountain may be stored in a second group, where each group includes one or more configuration parameters. More importantly, each group is stored as a single copy, e.g., on the database server 16, independent of the number of facilities.

Thus, if there are one-thousand facilities in the system, only a single set of configuration parameters for "HVAC schedule 1" is stored in the system. Users 6, 10, 20 may create as many "sets" of generic configuration parameter groups as needed, e.g., a set of generic heating configuration parameters may be created for facilities located at the top of a mountain (cold and/or dry climate), while another set of generic heating configuration parameters may be created for facilities located near the ocean (hot and/or humid climate). Storing only a single copy of the configuration parameters in the system simplifies maintenance of the system.

Each facility is associated with one or more groups. For example, association logic (e.g., an association matrix) may be employed that identifies the groups that are associated with the facilities. An exemplary association matrix is described below with respect to FIG. 3.

Upon a configuration parameter being modified 5, 7, 8, 9, 20, all facilities 1, 2, 3 associated with the changed configuration parameter are updated. For example, updating of the generic configuration parameters can be implemented via periodic store/server communication 11-14-15-23-25-17-25-23-15-14-11, at a given period $\mathcal{P}$. Once a user has changed a given set of generic configuration parameters, all facilities 1, 2, 3 are provided with the given changes before a time lapse $\mathcal{P}$.

For example, assume one thousand facilities are associated with a given set of generic configuration parameters $\mathcal{X}$, and that the communication period $\mathcal{P}$ is 1 minute. Once a user 6, 10, 20 applies a change to the set $\mathcal{X}$ of generic configuration parameters, the modification to $\mathcal{X}$ will reach one thousand stores within one minute. Say that an HVAC configuration parameter group has been created for the stores near the ocean. The corporate user may change some parameters of this group while the season goes from winter to summer. Then, all stores associated with this group, and only these stores, will receive this update.

More particularly, and with reference to FIG. 2, illustrated are three facilities 1, 2 and 3 that use two kinds of independent generic configuration parameters: the Indoor Lighting Schedules $\mathcal{X}$, $\mathcal{Y}$ and the Outdoor Lighting Schedules $\mathcal{A}$, $\mathcal{B}$. In the illustrated example, facility 1 uses the indoor schedule parameters $\mathcal{X}$ and outdoor schedule parameters $\mathcal{A}$; facility 2 uses the indoor schedule parameters $\mathcal{X}$ and outdoor schedule parameters $\mathcal{B}$, and facility 3 uses the indoor schedule parameters $\mathcal{Y}$ and outdoor schedule parameters $\mathcal{A}$. In FIG. 2, horizontal ellipses represent indoor lighting schedules (groups $\mathcal{X}$ and $\mathcal{Y}$) while the vertical ellipses represent outdoor lighting schedules (groups $\mathcal{A}$ and $\mathcal{B}$).

Facilities 1 and 2 in the above example may also be associated to other sets of generic configuration parameters. For example, facility 1 could be assigned to the outdoor lighting schedule $\mathcal{A}$, amongst all possible outdoor lighting schedules. All the facilities that are associated to this given outdoor lighting schedule $\mathcal{A}$ are part of the group of facilities that share this generic configuration parameters identified by the group. If facility 2 is associated with outdoor lighting schedule $\mathcal{B}$, then facilities 1 and 2 are part of the same group of facilities for the indoor lighting schedule parameters, but are not part of the same group of stores for the outdoor lighting schedule parameters. Finally, assume facility 3 is associated with outdoor lighting schedule $\mathcal{A}$. Thus, facilities 1 and 3 are in the same group $\mathcal{A}$ while the facility 2 is alone in its own group $\mathcal{B}$.

In some embodiments, given groups of generic parameters could be put in sets of mutually exclusive groups. For example, when such mutually exclusive sets are used, a given store may be associated to no more than one of the indoor schedule parameters. In this example, the outdoor schedule parameters would belong to another set of mutually exclusive groups. Then, the same given store could also be associated to one of the outdoor schedule parameter groups.

To associate facilities with a configuration parameter group, the system also includes association logic (e.g., an association matrix or other means for associating generic parameters to facilities). For example, facility 1 could be associated to the indoor lighting schedule $\mathcal{X}$, amongst all possible indoor lighting schedules. All the facilities that are associated to this given indoor lighting schedule $\mathcal{X}$ are part of the group of facilities that share the generic configuration parameters identified by the group. If facility 2 is also assigned to indoor lighting schedule $\mathcal{X}$, then facilities 1 and 2 are part of the same group $\mathcal{X}$ of facilities for the indoor lighting schedule generic configuration parameters.

Figure 3:
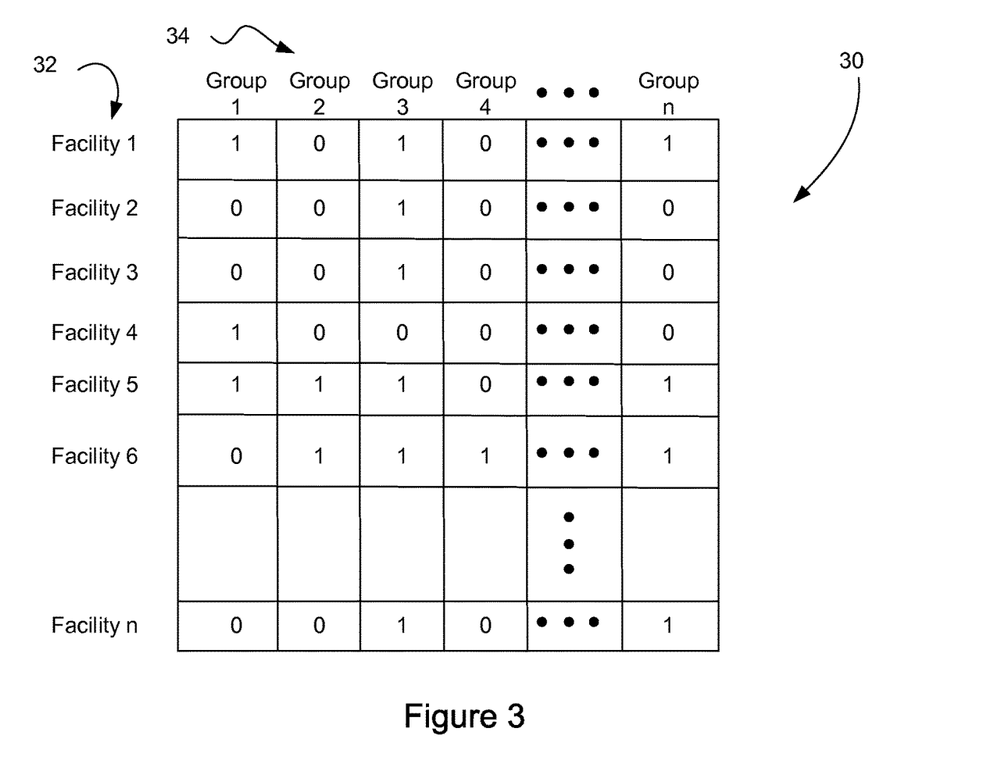
FIG. 3 illustrates an exemplary association matrix in accordance with the present disclosure.

FIG. 3 illustrates an exemplary association matrix 30. The association matrix 30 includes a plurality of rows 32 and a plurality of columns 34. Each row may correspond to a particular facility, while each column may correspond to a particular parameter group. Association between a facility and a particular group may be indicated by way of a numeric entry (e.g., a "0" indicates no association, while a "1" indicates association to the group). Thus, in the illustrated example facility 1 is associated with groups 1, 3 and n, facilities 2 and 3 are associated with group 3, facility 4 is associated with group 1, facility 5 is associated with groups 1, 2, 3 and n, and facility 6 is associated with groups 2, 3, 4 and n.

While the association matrix 30 is shown as a two-dimensional matrix, this is merely exemplary, and other embodiments are contemplated. For example, in one embodiment the association matrix is a three-dimensional matrix. In this regard, the rows form a first dimension, the columns form a second dimension, and a depth or "layer" form a third dimension.

For example, in one embodiment some groups of parameters may be part of a set of mutually exclusive groups, where a given facility is associated with no more than one of the groups (e.g., with only one indoor lighting schedule). In this regard, the first dimension of the matrix may identify the facility, the second dimension may identify the complementary sets of generic parameters, such as the kind of schedules (indoor light, outdoor light, refrigeration economy mode, HVAC economy mode, etc.), and the third dimension may identify individual groups that belong to given kinds of generic parameters, such as schedules for each kind of schedule. In this example, instead of a three-dimensional matrix having values of 0 and 1, a two dimensional matrix can be used with the ID of the selected individual group that is associated with a given facility.

In another embodiment each facility may be composed of subsystems and may include many kinds of equipment. Moreover, for some kinds of equipment the facility can use more than one of a given kind. Each equipment or each kind of equipment may share their own sets of generic parameters, such as schedules for lighting, schedules for HVAC, schedules for refrigeration, etc. Therefore, in this embodiment the first dimension of the matrix may identify the facility, the second dimension may identify the subsystems, such as refrigeration, lighting, HVAC, energy, etc., and the third dimension may identify the individual equipment to which the parameters apply, such as lighting zones, cold rooms, self-contain cases, HVAC roof top units (RTU), etc.

In another embodiment, association of generic parameters to particular facilities may be defined by templates, e.g., facility alarm templates. For example, the facility controller 11 can continually monitor the facility's processes, such as the temperature of cold rooms. When a given monitored value is contrary to its acceptable value for a specific time period, an alarm is activated. The acceptable values and time limits for a given monitored process can be grouped together into Alarm Templates.

Each such Alarm Template becomes a new group of Generic Parameters. Then, each monitored process of each facility can be associated to one Alarm Template. When the settings of a given Alarm Template have changed, the given generic parameter group is sent to all facilities that use the template.

Figure 4A:
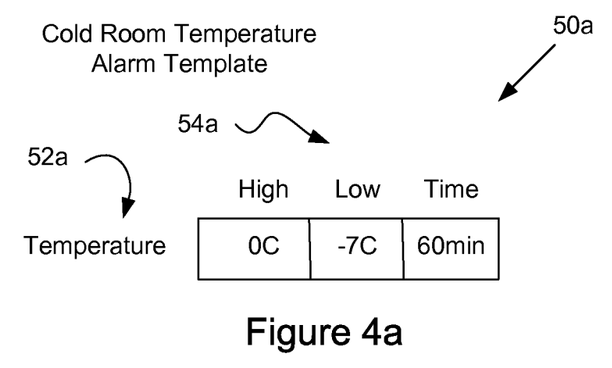
FIGS. 4a-4c illustrate exemplary alarm templates in accordance with the present disclosure.
Figure 4B:
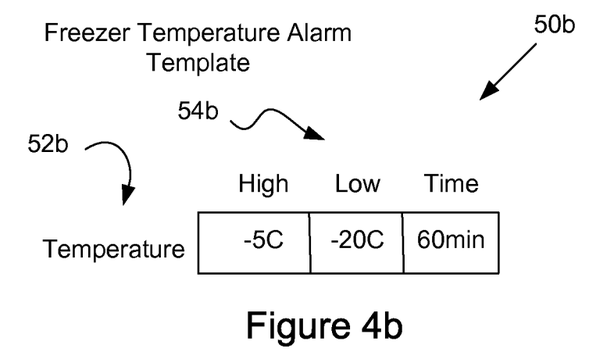
Figure 4C:
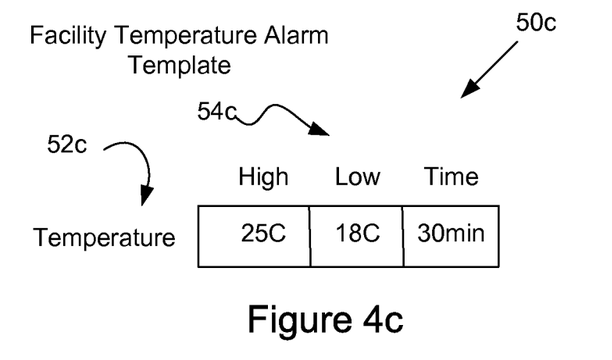

FIGS. 4a-4c illustrate exemplary alarm templates that may be used for storing generic parameters. More particularly, FIG. 4a illustrates a cold room alarm template 50a, FIG. 4b illustrates a freezer alarm template 50b and FIG. 4c illustrates a facility temperature alarm template 50c. Each exemplary template 50a, 50b and 50c includes a first row 52a, 52b and 52c, and a plurality of columns 54a, 54b and 54c. The intersection of the first row and the first column includes a high temperature alarm value, the intersection of the first row and the second column includes a low temperature alarm value, and the intersection of the first row and the third column includes a time value. The high temperature value is the high alarm limit for the particular process, the low temperature value is the low temperature limit for the particular process, and the time value is the time in which the actual temperature must be outside the alarm limits before an alarm is actually generated.

It is noted that while a specific process variable (i.e., temperature) is indicated in the templates of FIGS. 4a-4c, these are merely exemplary and other process variables are possible. For example, instead of temperature the process variable may be power consumption, power factor, humidity, etc.

For some facilities not all processes are monitored, so the association is optional. If a given facility does not use the newly modified Alarm template, it does not receive the modified generic parameters group.

Examples of Alarm templates for monitored processes include: facility temperature, energy power and power factor, door opening, evaporator differential temperature, proof of running, expansion valves superheat, overuse of relays override, etc. In one embodiment a flag is set to ensure changed parameters are transferred to the facility modules 11. More particularly, when a user changes a set of generic configuration parameters, such as for the above example, adding a holiday to the indoor lighting schedule $\mathcal{X}$, then the business rules server 19 can raise a dedicated "indoor lighting schedule changed" flag in the database server 16, for all the facilities associated to this given set $\mathcal{X}$ of generic configuration parameters. According to the example above this would raise the indoor-lighting-schedule-changed flag for facilities 1 and 2, but not for facility 3. As soon as the facility server 17 is connected to either facilities 1 or 2, the new indoor lighting schedule $\mathcal{X}$ is given to the connected facility module 11. Facility 3, however, will not receive its indoor lighting schedule parameters when connected as this facility is not associated to a modified indoor lighting schedule.

The control module 4 keeps the respective flag active until the facility module 11 has confirmed the reception of its new configuration. Then the facility server 17 resets the flag, in the database server 16, for this specific set of parameters (such as indoor lighting schedule) and for this specific facility. In this manner, the modification will be sent only once to each associated facility. Moreover, if a given facility has lost communications with the control module 4, a mechanism is in place to insure the changed parameters will be given to the facility module 11 as soon as communications are re-established.

In one embodiment, each set of generic configuration parameters is transferred "as a whole", which avoids the risk of an incoherent configuration when the communication channel is unexpectedly interrupted during transfer. More particularly, new parameters are not accepted by the facility module 11 until it is confirmed that all parameters have been transferred. Such confirmation may be by way of a handshake between the control module 4 and the facility module 11.

Accordingly, the system and method in accordance with the present disclosure simplify data management in a facility management system. Additionally, the system and method ensure all facilities receive the latest parameters, while minimizing network traffic.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for controlling a plurality of facilities, comprising:
   a plurality of facility modules for controlling operation of the plurality of facilities, each facility module corresponding to a respective facility of the plurality of facilities:
   a control module comprising a facility server and a database server communicatively coupled to the plurality of facility modules, the control module having access to
      i) a plurality of configuration parameter groups stored on the database server, each configuration parameter group of the plurality of configuration parameter groups including at least one configuration parameter, wherein at least some of the configuration parameter groups correspond to one of a lighting schedule, a climate control schedule, or an alarm template,
      ii) association logic defining an association between two or more of the plurality of facility modules and at least one configuration parameter group, and
      iii) a plurality of flags on the database server for each facility module associated with each configuration parameter group;
   wherein upon at least one configuration parameter being modified, the control module is configured to identity a modified configuration parameter group that includes the modified configuration parameter, and identify from the association logic the facility modules associated with the modified configuration parameter group, and set a subset of flags of the plurality of flags on the database server for the facility modules associated with the modified configuration parameter group, wherein the facility server is configured to receive a periodic update request from an individual facility module of the plurality of facility modules, upon receipt of the periodic request, the facility server is configured to access the database server and determine a flag is set that is associated with the individual facility module and, thereafter, communicate the at least one modified configuration parameter of the configuration parameter group associated with the set flag to the individual facility module and reset the flag, wherein the individual facility module controls operation of its respective facility using the at least one modified configuration parameter.

2. The system according to claim 1, wherein each of the plurality of configuration parameter groups are stored only as a single copy on the database server.

3. The system according to claim 1, wherein the control module and facility modules communicate via a network.

4. The system according to claim 1, wherein the control module further includes a web server configured to enable web access to the control module.

5. The system according to claim 1, wherein the control module further includes a business rules server configured to implement access restrictions to restrict access to the database server of the control module based on an access level of a user.

6. The system according to claim 1, wherein each of the plurality of configuration parameter groups are stored only in a single centralized storage location.

7. The system according to claim 1, wherein the association logic comprises an association matrix.

8. The system according to claim 7, wherein the association matrix is one of a two-dimensional matrix or a three-dimensional matrix.

9. The system according to claim 1, wherein the association logic comprises templates defining generic parameters to be monitored, the templates being assigned to respective facilities.

* * * * *